United States Patent [19]

Urban

[11] 3,709,660
[45] Jan. 9, 1973

[54] CATALYTIC TREATMENT OF THIOSULFATE CONTAINING SOLUTION WITH HYDROGEN TO PRODUCE SULFIDE

[75] Inventor: Peter Urban, Northbrook, Ill.

[73] Assignee: Universal Oil Products Company, Des Plaines, Ill.

[22] Filed: Jan. 14, 1971

[21] Appl. No.: 106,582

Related U.S. Application Data

[63] Continuation-in-part of Ser. No. 749,341, Aug. 1, 1968, abandoned.

[52] U.S. Cl. ..................423/566, 423/561, 252/439, 252/472
[51] Int. Cl. ......C01c 1/20, C01b 17/28, C01b 17/42
[58] Field of Search .........23/137, 134; 252/472, 439

[56] References Cited

UNITED STATES PATENTS 3,481,862  12/1969  Davis, Jr. et al................252/439 X
3,509,213  4/1970  Greenfield et al...............252/439 X

FOREIGN PATENTS OR APPLICATIONS 292,186  6/1928  Great Britain.........................23/134

Primary Examiner—Edward Stern
Attorney—James R. Hoatson, Jr. and Thomas K. McBride

[57] ABSTRACT

A water-soluble, inorganic thiosulfate compound is reduced to the corresponding sulfide compound by contacting an aqueous solution of thiosulfate compound and hydrogen with a catalyst, comprising a catalytically effective amount of cobalt sulfide combined with a porous carrier material, at reduction conditions. Principal utility of this treatment procedure is associated with the clean-up or regeneration of aqueous streams containing undesired thiosulfate compounds so that they can be reused in the process which originally produced them or discharged them into a suitable sewer without causing a pollution problem. Key feature of the disclosed method is the use of a unique catalyst which has extraordinary activity for converting thiosulfate to sulfide in an aqueous solution when hydrogen is utilized as the reducing agent.

12 Claims, No Drawings

CATALYTIC TREATMENT OF THIOSULFATE CONTAINING SOLUTION WITH HYDROGEN TO PRODUCE SULFIDE

CROSS-REFERENCES TO RELATED APPLICATIONS

This application is a continuation-in-part of my prior copending application Ser. No. 749,341 which was filed on Aug. 1, 1968, now abandoned.

The subject of the present invention is a method for the catalytic conversion of a water-soluble inorganic thiosulfate compound to a lower oxidation state—primarily to the corresponding sulfide compound. More specifically, the present invention relates to a novel catalytic process which utilizes controlled amounts of hydrogen in conjunction with cobalt sulfide-containing catalyst to effect a transformation in the oxidation level of a water-soluble inorganic thiosulfate compound. In one important aspect, it concerns a catalytic method for the production of ammonium hydrosulfide ($NH_4HS$) from an aqueous solution containing ammonium thiosulfate (($NH_4)_2S_2O_3$). In another important aspect, it encompasses catalytic treatment of an aqueous solution containing a thiosulfate compound, which generally is a waste stream produced during chemical and/or petroleum processing, in order to lower its biochemical oxygen demand and to remove nutrients that lead to excessive growth of vegetation so that the resulting treated aqueous stream can be conveniently disposed of in sewers and rivers, or reused in the process from which it originated.

As part of the price that has to be paid for a modern industrial society, large quantities of aqueous solutions of thiosulfate compounds are currently produced in a number of industrial processes. In particular, aqueous solutions containing ammonium thiosulfate are an undesired side product of many economically significant industrial processes in the chemical, petroleum, natural gas, paper and steel industries. For instance, in the petroleum industry, an aqueous solution containing ammonium thiosulfate is produced as a drag stream from sulfur recovery systems that employ an oxidation method to recover sulfur from ammonium hydrosulfide solutions, which are commonly available as side streams from such typical refinery processes as hydrorefining, hydrocracking, catalytic cracking, etc. Another source of these thiosulfate-containing streams are processes for natural gas sweetening, coal gas purification, town gas purification, and the like processes wherein hydrogen sulfide is scrubbed from a gaseous mixture containing same, and thereafter oxidized to elemental sulfur in a regeneration step. In these latter types of processes, an inevitable side reaction appears to be one leading to the formation of a thiosulfate salt which can then accumulate in the absorbent solution. The net amount of the thiosulfate by-product being produced must then be continuously or periodically purged from the system by discarding a drag stream. For example, in the Ferrox process for natural gas sweetening or for coal gas purification, where iron oxides suspended in an alkaline, aqueous solutions are used to extract $H_2S$ from the gas stream and where the rich scrubbing solution is regenerated by air oxidation, formation of a thiosulfate salt is observed as a by-product in the regeneration step, and a drag stream containing this salt must be periodically discarded. Another pertinent example is in the Thylox process. This process is typically utilized for coke-oven gas treating and employs a treating solution comprising arsenic trioxide and sodium carbonate dissolved in water. The regeneration of the rich scrubbing solution is by air oxidation in a separate oxidizing zone. Once again, a drag stream containing thiosulfate salts and water-soluble thiocyanate salts is removed from this process in order to purge the net make of thiosulfate, and this stream results in a requirement for continuous replacement of sodium carbonate and arsenic trioxide. Yet another example is the Perox process which utilizes an aqueous ammonium solution containing an organic oxidation catalyst and which regenerates the rich solution by oxidation with air with consequential thiosulfate by-product formation and requirement for a thiosulfate-containing drag stream. Regardless of the source of the aqueous stream containing the thiosulfate compound, it is clear that there is a substantial need for a method of treating the thiosulfate solution in order to remove the thiosulfate compound and allow either the reuse of the resulting treated aqueous stream in the process which produced it or the safe discharge of the resulting stream in sewers and/or rivers and streams. The first alternative is particularly advantageous when thiosulfate-containing stream also contains other valuable reagents such as in the Thylox process previously mentioned wherein the drag stream also contains sodium carbonate and arsenic trioxide. In addition, the growing sensitivity of the public to the adverse effects of indiscriminate discharge of waste stream by the chemical and petroleum industry provides an additional incentive for treating these thiosulfate-containing streams prior to their discharge into sewer systems.

In a case of particular interest, hydrorefining or hydrocracking of petroleum distillates containing nitrogenous and sulfurous contaminants, large quantities of ammonia and hydrogen sulfide are present in the effluent from the hydrocarbon conversion zone. These contaminants are generally absorbed in an aqueous absorbent solution which is injected into the effluent train of condensers and separating zones associated with the hydrocarbon conversion process. This results in an aqueous stream containing ammonium hydrosulfide ($NH_4HS$). As disclosed in my U.S. Pat. Nos. 3,530,063; 3,531,395; 3,536,618; and 3,536,619, this stream can thereafter be subjected to an oxidizing step in order to recover sulfur therefrom or to reduce the biochemical oxygen demand thereof. Despite stringent precautions a minor amount of thiosulfate salt (i.e., ($NH_4)_2S_2O_3$) is inevitably formed as a side product in this oxidation step. The resulting ammonium thiosulfate-containing aqueous solution withdrawn as effluent from this oxidation step cannot be directly reused to recover an additional portion of ammonium hydrosulfide because, if it is injected into the effluent train associated with the hydrorefining or hydrocracking process, the hydrogen sulfide and/or ammonium hydrosulfide present in this effluent can react with the ammonium thiosulfate to produce free sulfur which can contaminate the hydrocarbon product from this process leading to severe corrosion problems in downstream equipment. Accordingly, there is a substantial need for a method of treating an aqueous solution containing ammonium thiosulfate compound in order to allow reuse of the treated aqueous stream within the process which produced it.

The inorganic thiosulfate compound present in these aqueous solutions is generally present as a water-soluble salt of a relatively common base such as ammonium thiosulfates, and the various alkali metal thiosulfates such as sodium thiosulfate and potassium thiosulfate; and the alkaline earth metal thiosulfates such as calcium thiosulfate, magnesium thiosulfate, strontium thiosulfate and barium thiosulfate. It is, of course, understood that the thiosulfate compound may be ionized to various degrees in the aqueous solution and indeed the solution typically will contain thiosulfate ion. For purposes of the present invention, the preferred thiosulfate compounds are ammonium thiosulfate and sodium thiosulfate. The thiosulfate compound may be present in the aqueous solution in any amount up to the solubility limit at the conditions utilized in the present method. Typically, the thiosulfate compound will comprise about 0.1 to about 30 wt. % of the solution. For example, excellent results are obtained with a solution containing about 22 wt. % sodium thiosulfate.

Quite understandably in recent years, attention has been focused upon a search for means of converting these thiosulfate compounds into products that can be easily separated from the aqueous stream, thereby allowing a reuse of the aqueous stream in the process from which it came or its discharge into any suitable and available sink such as rivers, lakes, streams, ponds, etc. I have now found a method for catalytically converting these water-soluble thiosulfate compounds into the corresponding sulfide compound which can be easily removed from the resulting treated stream by a conventional stripping step if desired, or in many cases can be left in the treated stream as it does not adversely effect the properties of the aqueous stream when it is reused. In other words, the sulfide product of the method of the present invention can remain, if desired, in the treated aqueous stream when it is reused—for example, when the treated stream is recycled to absorb additional quantities of hydrogen sulfide. My method essentially involves the use of a cobalt sulfide catalyst in a treatment procedure wherein hydrogen is used to reduce the thiosulfate to sulfide.

It is, accordingly, an object of my invention to provide a catalytic method for the selective production of a sulfide compound from a solution of a water-soluble thiosulfate compound. Another object is to provide a catalytic method for purifying thiosulfate containing waste streams so that they may be reused if desired. Still another broad objective is to control a source of water pollution by chemical, petroleum, steel and the like industries. Another object is to provide a catalyst for this reaction which is highly active and highly selective for sulfide.

In brief summary, my invention is, in one embodiment, a method for selectively reducing an inorganic, water-soluble thiosulfate compound to the corresponding sulfide compound. The method essentially involves contacting an aqueous solution of the thiosulfate compound and hydrogen with a catalyst, comprising a combination of a catalytically effective amount of cobalt sulfide with a porous carrier material, at reduction conditions including a temperature of about 100° C. to about 350° C. and a pressure at least sufficient to maintain a portion of the aqueous solution in the liquid phase.

In another embodiment, the invention is a method as outlined above in the first embodiment wherein the catalyst comprises a combination of cobalt sulfide with an activated carbon carrier material in an amount sufficient to result in a catalyst containing, on an elemental basis, about 0.1 to about 40 wt. % cobalt.

In another embodiment, the present invention is a method as characterized above in the first embodiment wherein the thiosulfate compound is ammonium thiosulfate or sodium thiosulfate.

Other embodiments and objects of the present invention encompass details about particular thiosulfate-containing solutions, preferred catalytic compositions, preferred process conditions, and particularly useful flow schemes, all of which are hereinafter disclosed in the following discussion of each of these facets of the present invention.

One essential feature of the present invention is the utilization of a cobalt sulfide-containing catalyst. As will be demonstrated in the examples, I have determined that the cobalt sulfide catalyst has exceptionally high activity for the conversion of thiosulfate compounds coupled with an extraordinarily high selectivity for the corresponding sulfide compound. Moreover, these characteristics are unique to cobalt sulfide and are not shared by other iron group sulfides. These characteristics of this cobalt sulfide catalyst render its use particularly beneficial in this reduction reaction because it does not produce, to any substantial degree, side products, which can collect on the surface of the catalyst and block access of the reactants to the catalyst, thereby rapidly deactivating the catalyst or which can contaminate the treated stream. In addition, the high activity of the cobalt sulfide catalyst for this reduction reaction enables the reaction to be conducted at conditions which are of relatively low severity, thereby effecting savings in utilities associated with the process such as cost of heat generation, $H_2$ compressor capacity, etc.

Although in some cases a slurry or finely divided particle of the cobalt sulfide catalyst can be utilized in a moving bed-type system or fluidized-type system to catalyze the desired reduction reaction, a fixed bed-type system is preferred. In particular, I have found best results when a cobalt sulfide component is combined with a suitable porous carrier material and utilized in a fixed bed-type system. Examples of suitable porous carrier materials are carbonaceous materials such as wood charcoal, bone charcoal, carbons, high surface area coke, deactivated hydrocarbon conversion catalysts etc. which materials may be activated prior to use; refractory inorganic oxides such as alumina, silica, zirconia, bauxite and the like. Particularly good results are obtained with activated carbons such as those commercially available under trade names of Norit, Nuchar, Darco, and other similar carbon materials familiar to those skilled in the art. In addition, other natural or synthetic highly porous refractory inorganic carrier materials such as various forms of clay, kieselguhr, etc. may be used if desired. The preferred porous carrier materials are alumina, particularly gamma-alumina, and activated carbon. Thus, cobalt sulfide combined with alumina or with activated carbon are particularly preferred catalysts for the method of the present invention.

Although any known method can be used, the preferred method for combining the cobalt sulfide with the carrier material is by impregnating the carrier material with an aqueous solution of a soluble decomposable salt of cobalt such as cobalt acetate, cobalt benzoate, cobalt chloride, cobalt fluoride, cobalt nitrate, cobalt sulfate, cobalt bromide, cobalt chlorate and the like compounds. The cobalt component of the resulting composite can then be converted to the sulfide by treatment with hydrogen sulfide or any other sulfide-yielding compound at sulfiding conditions. The resulting sulfided composite is thereafter washed with an aqueous and/or ammoniacal solution and dried. In some cases, it may be advantageous to calcine or oxidize the impregnated carrier material to obtain a distribution of cobalt oxide on the carrier material which can thereafter be sulfided with a suitable sulfur-containing compound, preferably hydrogen sulfide, at sulfiding conditions in order to obtain the desired catalyst. It is to be noted that a cobalt-oxide-containing catalyst can be utilized initially in the present method; conversion to cobalt sulfide would then occur in situ during the initial portion of the run.

In general, the cobalt sulfide component can be combined with the carrier material in any amount which is catalytically effective. An amount sufficient to result in a final composite containing about 0.1 to about 40 wt. % cobalt, calculated as the elemental metal, is ordinarily preferred. Especially preferred catalysts contain about 1 to about 10 wt. % cobalt as cobalt sulfide. Accordingly, examples of particularly preferred catalytic composites for use in the present invention are : about 1 to about 10 wt. % cobalt as cobalt sulfide on an activated carbon support or on an alumina support.

An essential reactant for the method of the present invention is hydrogen. This may be utilized in any suitable form, either by itself or mixed with other relatively inert gases such as a mixture of hydrogen with $C_1$ to $C_4$ hydrocarbons, a mixture of hydrogen and nitrogen, a mixture of hydrogen and carbon dioxide, a mixture of hydrogen and hydrogen sulfide, etc. The excess recycle gas obtained from various petroleum processes that have a net hydrogen make such as a reforming process, a dehydrogenation process, etc. may also be used if desired. It is preferred that hydrogen be utilized in an amount equivalent to or greater than the stoichiometric amount required for the reduction of thiosulfate to sulfide. The stoichiometric amount is 4 moles of hydrogen per mole of thiosulfate. Thus a mole ratio of hydrogen to thiosulfate of about 4:1 to about 50:1 can be utilized. In addition, it is preferred to operate at a hydrogen to thiosulfate mole ratio which is greater than the stoichiometric amount—preferably about 1.5 to about 10 times greater than the stoichiometric amount. Hence, about 6 to about 50 moles of hydrogen per mole of the thiosulfate compound is preferably used. It is understood that the unreacted hydrogen recovered from the effluent stream withdrawn from the reduction step of the present invention can be separated and recycled, if desired, through suitable compressive means to supply at least a portion of the hydrogen from the present reaction.

The method of the present invention can be carried out in any suitable manner, in either a batch or continuous type system. A particularly preferred procedure involves a fixed bed catalyst system in which the catalyst is disposed in a reduction zone. According to the present invention, the thiosulfate-containing aqueous solution is then passed therethrough in either upward, radial or downward flow with hydrogen being simultaneously introduced therein in either countercurrent or concurrent flow relative to the thiosulfate solution. In particular, a preferred embodiment involves concurrent downflow of the thiosulfate solution and hydrogen stream through the reduction zone.

In the preferred concurrent flow embodiment, the effluent stream withdrawn from the reduction zone contains the sulfide compound product of the reduction reaction, a minor amount of unreacted thiosulfate, unreacted hydrogen and water. Hydrogen along with some hydrogen sulfide is typically separated from the aqueous effluent stream in a separating zone and recycled to the reduction zone. If desired, the sulfide product may be completely stripped from the resulting treated aqueous solution via a suitable stripping operation such as by injecting the sulfide containing solution into a stripping column and utilizing steam or any other suitable stripping means to remove hydrogen sulfide overhead with recovery of a substantially sulfide-free treated aqueous solution from the bottom of the stripping column. This treated aqueous solution may then be discharged in any suitable manner without causing any significant waste disposal problem since it has a relatively minor biochemical oxygen demand and it does not contain any nutrients that lead to excessive growth of stream vegetation. In may cases, the aqueous effluent stream containing the sulfide compound can be directly reused in the process from which the thiosulfate-containing aqueous solution was originally withdrawn.

In another embodiment, the thiosulfate-containing aqueous stream is passed downflow into the reduction zone containing the cobalt sulfide catalyst and the hydrogen stream is passed upflow through this zone. This countercurrent operation produces an overhead stream containing hydrogen and hydrogen sulfide and a bottom aqueous stream which is substantially free of both thiosulfate and sulfide salts. The overhead gaseous stream can be treated to remove at least a portion of the $H_2S$ therefrom and the resulting hydrogen stream is recycled if desired. Thus, the principal advantage associated with this embodiment is the utilization of the reduction zone to perform two functions: the reduction of the thiosulfate salts and the simultaneous stripping of the sulfide product from the treated aqueous effluent stream.

In some situations it may be advantageous to operate the present invention in a multi-state manner in order to effect complete conversion of thiosulfate to sulfide. The techniques for performing a multi-stage reduction operation are well-known to those skilled in the art and will not be repeated here.

The conditions utilized in the process of the present invention are generally described as a reduction condition effecting conversion of thiosulfate to sulfide. The temperature utilized is preferably selected drom the range of about 100° C. to about 350° C., with best results obtained at approximately 150° C. to about 225° C. The pressure employed is at least a pressure which is sufficient to maintain at least a portion of the thiosulfate solution in liquid phase. In general, it is preferred to operate at pressures substantially above this minimum pressure and pressures of about 100 to about 3,000 psig. are particularly preferred.

In the embodiment of the present invention wherein the process is operated in a batch type operation, the contact time utilized is preferably from about one-half to about 5 hours, with best results obtained with a contact time of about 1 to about 2½ hours. In a continuous process it is preferred to use a liquid hourly space velocity (defined on the basis of the volume charge rate of thiosulfate solution per hour divided by the total volume of catalyst within the reduction zone) ranging from about 0.5 to about 10 hr.$^{-1}$, with best results obtained at about 1 to about 3 hr.$^{-1}$.

The following examples are given to illustrate further the novelty, preferred modes of operation, and utility of the present invention. These examples are intended to be illustrative rather than restrictive.

EXAMPLE I

This example demonstrates the present invention in a batch embodiment with a catalyst comprising cobalt sulfide combined with alumina.

A gamma-alumina carrier material is manufactured in accordance with the method described in U. S. Pat. No. 2,620,314 by passing droplets of an alumina hydrosol into an oil bath by means of a nozzle or rotating disk. After specific aging, drying and calcining treatments as specified in this patent, the carrier material is recovered in the form of 1/16 inch gamma-alumina spheres. The resulting spheres are then impregnated with a solution of cobalt nitrate in an amount sufficient to result in a final composite containing 2.2 wt. % cobalt. After drying, the impregnated carrier material is heated for about 2 hours in a stream of air at a temperature of about 800° F. in order to decompose the nitrate. Subsequently, the resultant composite is sulfided by passing a stream of $H_2S$ over it at room temperature.

The resulting catalyst in an amount of 2 grams is then placed in a batch type reaction zone. A solution of ammonium thiosulfate is then prepared by dissolving 10 grams of $(NH_4)_2S_2O_3$ in 250 cc. of water to produce a solution containing 0.68 moles of $(NH_4)_2S_2O_3$. The resulting solution is then added to the reaction zone. The reaction zone is thereafter sealed off and pressurized with substantially pure hydrogen gas to a pressure of about 1,500 psig. The amount of hydrogen present in the reaction zone is equivalent to about 40 moles of hydrogen per mole of thiosulfate. The temperature of the reaction zone is then raised to 200° C. and is maintained at this level for 1 hour. At the end of this time the products from the reaction zone are analyzed and it is found that 99 wt. % of the $(NH_4)_2S_2O_3$ is reduced with the selectivity for $NH_4HS$ being greater than 95 percent based on the moles of converted thiosulfate sulfur that is recovered as sulfide sulfur.

Accordingly, this example evidences the high activity of the cobalt sulfide catalyst for converting thiosulfate compounds coupled with the catalyst's extremely high selectivity for producing the corresponding sulfide compound.

EXAMPLE II

This example indicates the benefits of the present invention in a batch type operation with a slurry of cobalt sulfide. In an experiment similar to that reported in Example I, 1 gram of cobalt sulfide particles in a particles size of about 100 to 200 mesh is added to the reaction zone. The composition of the thiosulfate solution and the conditions utilized in the reaction zone are identical to those reported in Example I. At the end of the experiment, an analysis of the liquid product withdrawn from the reaction zone reveals that 92 wt. % of the thiosulfate was converted at a selectivity for $NH_4HS$ of greater than 90 percent.

EXAMPLE III

This example demonstrates the use of the present invention in a continuous process in which the catalyst is utilized as a fixed bed in a reaction zone with a thiosulfate-containing solution being continuously fed into the reaction zone and an effluent stream containing $NH_4HS$ being continuously withdrawn from the reaction zone.

A commercially available activated carbon carrier material (known as Darco charcoal) in a 12–20 mesh size was impregnated with a solution of cobalt acetate in an amount sufficient to result in a final catalyst containing 2.3 wt. % cobalt calculated on an elemental basis. The catalyst was then sulfided with hydrogen sulfide at room temperature in an amount sufficient to convert the cobalt to cobalt sulfide. Thereafter, the catalyst was washed with water and an ammoniacal aqueous solution.

The resulting catalyst in an amount 99 cc. was then placed in a reaction zone and supported therein as a fixed bed. A thiosulfate-containing feed stream was then prepared by dissolving $(NH_4)_2S_2O_3$ in an ammoniacal aqueous solution in a mole ratio of about 0.25 moles of $(NH_4)_2S_2O_3$ per mole of $NH_4OH$. The resulting aqueous, ammoniacal solution contained 2 wt. % sulfur as $(NH_4)_2S_2O_3$.

A series of experiments were then made using this catalyst and feed stream. In these experiments, a hydrogen system was commingled with the thiosulfate-containing aqueous stream and heated to the desired conversion temperature. The resulting heated mixture was then passed downflow into the reaction zone containing the catalyst. An effluent stream was withdrawn from the bottom of the reaction zone and passed to a separating zone wherein a hydrogen-containing gaseous phase separated from a liquid aqueous phase. The gaseous phase was analyzed for hydrogen sulfide concentration, and the aqueous phase was analyzed to determine the concentration of $(NH_4)_2S_2O_3$ and $NH_4HS$.

Table 1 presents the results of the series of experiments conducted with this feed stream in this conversion plant. As can be seen from Table I, the conditions utilized for each experiment are disclosed therein. From the last two columns of Table I, it can be ascertained that this catalyst possessed an extremely high activity at 200° C. for converting thiosulfate coupled with a high selectivity for the corresponding sulfide compound. For example, at a temperature of 200° C, a pressure of 300 psig., a LHSV of 1 hr.$^{-1}$, and a H$_2$: (NH$_4$)$_2$S$_2$O$_3$ mole ratio of 40:1, a conversion of 98 to 99 wt. % of the thiosulfate is obtained (see experiments 4 and 6), and even more significantly, the selectivity for the volatile sulfide is 90 to 92.5 percent. Hence, the advantages of the present invention are evident.

TABLE I – SUMMARY OF RESULTS FOR CONTINUOUS REDUCTION OF (NH$_4$)$_2$S$_2$O$_3$

| Experiment No. | T, °C | P, psig. | LHSV, hr.$^{-1}$ | H$^2$:(NH$_4$)$_2$S$_2$O$_3$ | Conversion,* Wt. % | Selectivity,** for S$^{--}$, % |
|---|---|---|---|---|---|---|
| 1 | 200 | 1000 | 1 | 40:1 | 99 | 90 |
| 2 | 100 | 1000 | 2 | 20:1 | 18 | 89 |
| 3 | 200 | 300 | 2 | 20:1 | 73 | 93 |
| 4 | 200 | 300 | 1 | 40:1 | 99 | 90 |
| 5 | 200 | 1000 | 2 | 20:1 | 99 | 90 |
| 6 | 200 | 300 | 1 | 40:1 | 98 | 92.5 |

*Based on disappearance of (NH$_4$)$_2$S$_2$O$_3$ from feed.
**Percent of converted thiosulfate sulfur that is recovered as S$^{--}$ (NH$_4$HS).

EXAMPLE IV

In order to demonstrate the unique properties of the cobalt sulfide catalyst in a batch type embodiment, a series of experiments were performed in which the various iron group metal sulfides were used as catalysts for the reduction of ammonium thiosulfate with hydrogen.

In all of these experiments, the feed utilized was 250 cc of an aqueous solution containing 10 grams of ammonium thiosulfate. Likewise the conditions utilized in all of these experiments were: an initial temperature of 200° C., a reaction time of 1 hour, a pressure of about 1,500 psig. and a hydrogen to ammonium thiosulfate mole ratio which was substantially in excess of the stoichiometric amount required to reduce thiosulfate to sulfide.

In all of the experiments, an autoclave reactor of about 850 cc. capacity was utilized. In the first experiment, the catalyst was 1 gram of finely divided particles of cobalt sulfide. In the second experiment, the catalyst was 10 grams of finely divided particles of nickel sulfide. And in the third experiment, the catalyst utilized was two grams of finely divided particles of iron sulfate. In each case, the solution was added to the reactor, then the catalyst was added and thereafter the reactor was mixed with pure hydrogen to achieve final pressure of about 1,500 psig.

The reactor was then heated to the starting temperature of 200° C. After a reactor period of about 1 hour, the reactor was cooled to room temperature and its contents analyzed.

The results of this analysis indicated that the cobalt sulfide catalyst was able to achieve a conversion of thiosulfate to sulfide of 92 percent of the initial charge of thiosulfate. In contrast, the nickel sulfide catalyst achieved a conversion of 52 percent on the same basis. The iron catalyst was inferior to the nickel catalyst and achieved only 40 percent conversion of the thiosulfate charged to sulfide. It is to be noted that under these conditions the iron sulfate that was charged to the reactor is quickly converted in situ to the corresponding iron sulfide during the initial portion of the reaction.

In sum, these results demonstrate the marked superiority of cobalt sulfide relative to the other iron group sulfides for accelerating the reaction between hydrogen and an aqueous solution of thiosulfate to produce the corresponding sulfide.

EXAMPLE V

A series of catalysts were prepared by impregnating 12 to 20 mesh particles of activated carbon with varying amounts of the iron group metals. In all cases, the carrier material was contacted, at impregnation conditions, with an aqueous solution containing the required amount of the metallic component in the form of a water-soluble, decomposable compound of the specific iron group metal desired. The resulting catalysts were then sulfided with hydrogen sulfide at room temperature in in an amount sufficient and under conditions selected to convert the metallic component to the corresponding metallic sulfide. Thereafter, the sulfided catalysts were washed with water and an ammoniacal solution. A listing of the various catalysts prepared along with their contents is presented in Table II.

TABLE II — SUMMARY OF CATALYST TESTED

| Catalyst Designation | Metallic Ingredient | Amount of Metal, wt. % |
|---|---|---|
| A | NiS | 4.8 |
| B | CoS | 2.3 |
| C | NiS | 20.5 |
| D | NiS | 38 |
| E | CoS | 4.6 |
| F | FeS | 20 |
| G | CoS | 9 |
| H | PdS | 1 |

The resulting catalyst were then separately utilized in an experiment designed to determine their relative activity for the reduction of an aqueous solution of sodium thiosulfate with hydrogen in a continuous flow type of operation. In this test, the input aqueous solution was an aqueous solution of sodium thiosulfate containing 9 wt. % sulfur in the form of sodium thiosulfate. The comparison tests were all made in a pilot plant wherein the catalyst to be tested was loaded into a conventional reaction zone, and a mixture of the aqueous solution and the hydrogen stream was passed down flow into the reaction zone. The conditions utilized in each one of these tests were: a pressure of 500 psig., a LHSV of 1 hrs.$^{-1}$ and a mole ratio of hydrogen to sodium thiosulfate of 4:1. The reaction temperatures utilized in each run are given in the following Table III. Each test run consisted of an 8 hr. line-out period followed by an 8 hour test period. The products of the reaction were collected and analyzed to determine the amount of sulfide produced. The results of these comparison tests are presented in the following Table III for each of the catalysts tested in terms of reaction temperature utilized and amount of sulfide produced expressed as percent of charged thiosulfate which was converted to product sulfide.

TABLE III — RESULTS OF CATALYST ACTIVITY STUDY

| Catalyst Designation | Metallic Ingredient | Amount of Metal, wt. % | Inlet Reactor Temp. °F. | Conversion to S$^{--}$ % |
|---|---|---|---|---|
| A | NiS | 4.8 | 169 | 7 |
| B | CoS | 2.3 | 171 | 77 |
| C | NiS | 20.5 | 169 | 21 |
| D | NiS | 38 | 168 | 10 |
| E | CoS | 4.6 | 170 | 100 |
| F | FeS | 20 | 168 | 27 |
| G | CoS | 9 | 171 | 99 |
| H | PdS | 1 | 169 | 28 |

With reference now to Table III, it can be seen that a wide variation in results were obtained for the various catalyst tested. The catalysts were all group VIII metal-containing composites; however, only the cobalt sulfide-containing catalyst produced significant conversion to sulfide. Specifically, Catalyst "B," "E" and "G" were all cobalt sulfide-containing catalysts and they all achieved a rather high level of conversion to sulfide. In contrast, the other members of the iron group were substantially inferior to cobalt in this respect. Likewise, the sole member of the platinum group metals tested, palladium sulfide, achieved only a 28 percent conversion to sulfide. It is to be particularly noted that a catalyst containing relatively large amounts of iron sulfide, Catalyst "F," was only able to achieve a conversion level of 27 percent. This inferior performance of this iron sulfide-containing catalyst stands in marked contrast to the superior performance of the cobalt sulfide-containing catalyst.

These results provide additional evidence of the rather remarkable and unexpected capability of the instant cobalt sulfide-containing catalyst to accelerate a reaction between an aqueous solution of a thiosulfate compound and hydrogen in order to selectively produce sulfide. In addition, these results demonstrate that the superior capabilities of cobalt sulfide in this reaction are unique. That is, the other members of group VIII of the Periodic Table, particularly the other iron group metals, do not possess the unique capability of cobalt sulfide to effectively catalyze the desired reaction.

It is intended to cover by the following claims all changes and modifications of the above disclosure of the present invention that would be self-evident to a man of ordinary skill in the water-treating art.

I claim as my invention:

1. A method for reducing an inorganic, water-soluble thiosulfate compound to a sulfide compound, said method comprising contacting an aqueous solution of the thiosulfate compound and hydrogen with a catalyst, comprising a combination of a catalytically effective amount of cobalt sulfide with a porous carrier material, at reduction conditions including a temperature of about 100° C. to about 350° C. and a pressure at least sufficient to maintain a portion of said aqueous solution in the liquid phase.

2. A method as defined in claim 1 wherein said thiosulfate compound is ammonium thiosulfate.

3. A method as defined in claim 1 wherein said thiosulfate compound is an alkali metal thiosulfate.

4. A method as defined in claim 3 wherein said alkali metal thiosulfate is sodium thiosulfate.

5. A method as defined in claim 1 wherein said thiosulfate compound is an alkaline earth metal thiosulfate.

6. A method as defined in claim 1 wherein the porous carrier material is a carbonaceous material.

7. A method as defined in claim 6 wherein said carbonaceous material is activated carbon.

8. A method as defined in claim 1 wherein said porous carrier material is a refractory inorganic oxide.

9. A method as defined in claim 8 wherein said refractory inorganic oxide is alumina.

10. A method as defined in claim 1 wherein cobalt sulfide is present in the catalyst in an amount sufficient to result in a catalyst containing, on an elemental basis, about 0.1 to about 40 wt. % cobalt.

11. A method as defined in claim 1 wherein said hydrogen is present in an amount corresponding to a mole ratio of thiosulfate and of hydrogen to said thiosulfate compound of about 4:1 to about 50:1.

12. A method as defined in claim 1 wherein said thiosulfate compound comprises about 0.1 to about 30 wt. % of the aqueous solution.

* * * * *